United States Patent Office 2,767,177
Patented Oct. 16, 1956

2,767,177

COMPLEXES OF BENTONITE, POLYAMINE AND MONOQUATERNARY AMMONIUM COMPOUNDS

John G. Erickson, Minneapolis, Minn., assignor to General Mills, Inc., a corporation of Delaware No Drawing. Application October 3, 1952,
Serial No. 313,051

4 Claims. (Cl. 260—242)

The present invention relates to reaction products of bentonite with polyamines and with a monoquaternary ammonium compound containing two fatty groups. These reaction products are novel compounds which are particularly useful in the production of greases having unusual properties.

Reaction products of bentonite with quaternary ammonium compounds containing two fatty groups are known and have been used in the production of greases. The reaction product is apparently a salt of the quaternary ammonium compound with the high molecular weight complex acid which occurs in bentonite in the form of a sodium or potassium salt. When these reaction products are mixed with hydrocarbons, grease-like gels result. Excellent greases can be prepared from heavy mineral oil with these reaction products. A grease of this type has a high flow point and an excellent service life.

It has now been found that reaction products of bentonite with a polyamine and a monoquaternary ammonium compound containing two fatty groups have unusual properties and are particularly adapted for use in the production of gelled greases. The term "bentonite-polyamine complex" or simply the word "complex" will be used herein to refer to this broad class of compounds.

It is, therefore, an object of the present invention to provide novel reaction products of bentonite with a polyamine and a monoquaternary ammonium compound containing two fatty groups.

It is a further object of the present invention to provide novel greases prepared from the products referred to above.

Bentonite occurs in the form of minute platelets which are microscopic in size. The polyamine reacts with the salt group in the platelets to effect cross-linking between the platelets. These preliminary reaction products are then reacted with a monoquaternary ammonium compound containing two fatty groups. In this further reaction the fatty quaternary ammonium group reacts with further salt groups in the bentonite.

The polyamines which can be used in the present invention are of a wide variety. The term "polyamine" as used herein is intended to include compounds which include two or more amino groups. Any polyamine may be used which contains amino groups sufficiently basic to form acetate salts. The nitrogen atoms of the polyamine can be separated by hydrocarbon groups such as methylene, ethylene, propylene and the like, or by groups containing hetero atoms, such as oxygen, nitrogen, or sulphur. The group intervening between the nitrogen atoms can be a straight or branched chain and can contain aromatic or heterocyclic nuclei. In polyamines containing more than two amino groups, the groups intervening between the various nitrogen atoms can be alike or different.

Primary, secondary and tertiary polyamines can be used. A wide variety of substituents can be present on the nitrogen atom. These include simple alkyl groups such as methyl, ethyl, propyl, dodecyl, octadecyl and the like, and substituted alkyl groups, such as hydroxyethyl, aryl or heterocyclic groups such as phenyl, tolyl, thienyl, pyridyl and the like. Similarly, the nitrogen atom of the amino group can be part of a heterocyclic ring as in the case of some of the compounds listed hereinafter. Preferably, the polyamine should not contain groups intervening between the nitrogen atoms which are unstable or which might be likely to cleave either during the reaction with the bentonite or at some stage in the use of the compound. The list appearing below includes polyamines which can be used in the present invention. This list includes complete compounds as well as groups which contain a plurality of amino groups. The compounds derived from these groups may be monomeric, in which case the remaining valences can be satisfied by hydrogen or some other group, or the compound may be polymeric containing a number of the indicated recurring groups. In addition, the polyamine may be employed either in the form of the free amine or in the form of a salt. Furthermore, some of the amine groups may be in the form of salts and other amine groups in the same compound may be free amines. Typical acids which can be used to form the salt include formic, acetic, hydrochloric, nitric, phosphoric and the like.

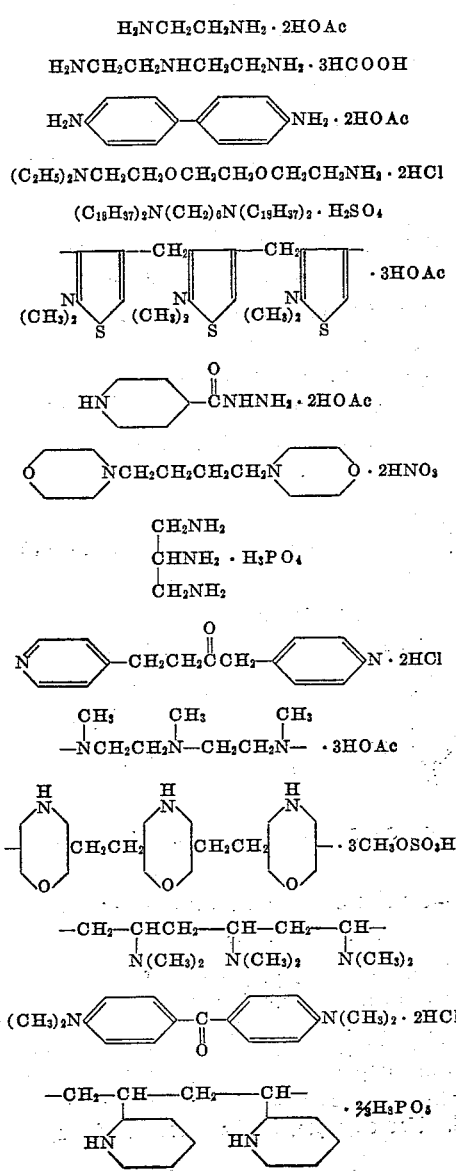

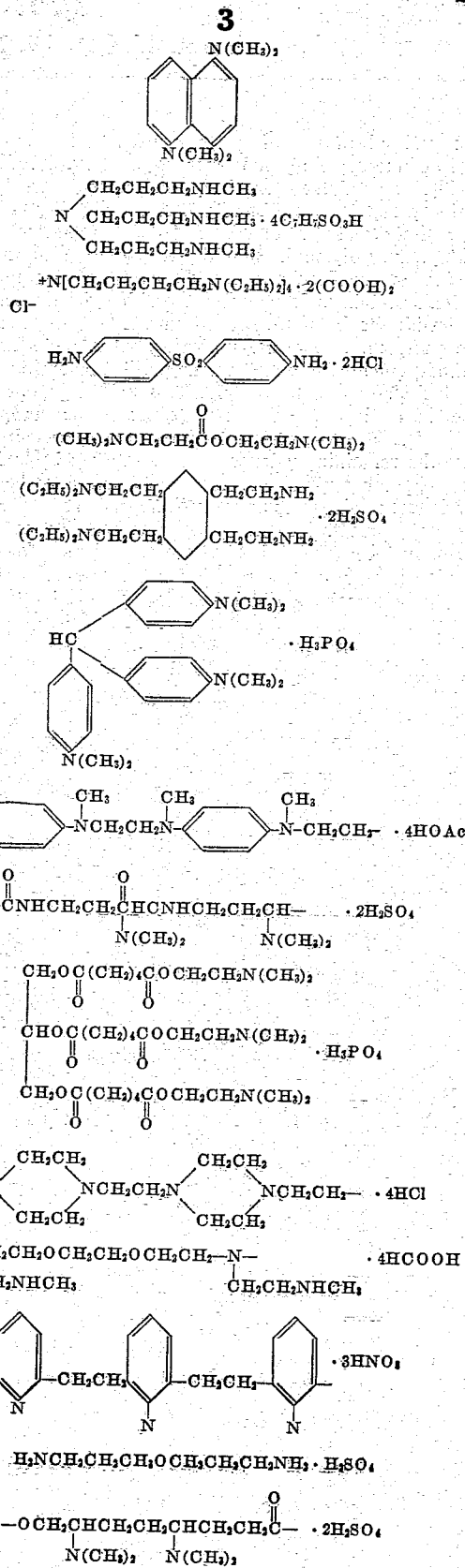

A desirable group of polyamines, from an economic standpoint, are those derived from the alkenes, such as ethylene, propylene and butylene. These polyamines are prepared by reacting the alkenes with halogen to form the dihalide, which is then reacted with ammonia. In the latter reaction, a mixture of reaction products is obtained. For example, in the reaction of ethylene di- chloride with ammonia, the reaction mixture contains ethylene diamine, diethylene triamine, triethylene tetramine, tetraethylene pentamine and so forth. Each of these compounds is useful for the present invention, and for economic reasons it is preferred to employ the crude reaction mixture, rather than the more costly isolated individual polyamines. There is no apparent limit to the number of recurring units in a polyamine of this type which is useful for the present invention. Each amine group is available for reaction with the bentonite. The polyamines derived from the alkenes have the following recurring group $$-NHCHCH_2-$$
$$\phantom{-NH}R\phantom{HCH_2-}$$

in which R is methyl or ethyl.

From the standpoint of effectiveness in increasing the stiffness of greases, the preferred polyamines are those which contain 1 or more fatty groups containing from 8–22 carbon atoms. These may be prepared from primary or secondary fatty amines with dihalides in which the halogen atoms are separated by either less than 4 or more than 5 atoms. For reaction with the primary or secondary fatty amine, the polyhalogen compounds are preferably those in which the halogen atoms are separated by hydrocarbon groups, either straight or branched chain, containing from 2–6 carbon atoms, or by polyoxyalkylene groups containing from 2–6 recurring units, each alkylene group containing from 2–6 carbon atoms. Typical polyhalogen compounds include ethylene dichloride, ethylene dibromide, propylene dichloride, propylene dibromide, tri- and tetraglycol dichlorides, trimethylene dichloride and p-bis(chloromethyl)benzene.

The bentonite-polyamine complex is further reacted with a monoquaternary ammonium compound containing two fatty groups. These monoquaternary ammonium compounds containing the two fatty groups are conventionally employed for the preparation of complexes of this type referred to previously and any of the quaternary ammonium compounds used for that purpose can be used for the present invention. The fatty groups in the quaternary ammonium compound can contain from 8–22 carbon atoms and can be either saturated or unsaturated. The other substituents on the nitrogen atoms usually are short-chained alkyl groups containing from 1–4 carbon atoms. The anions associated with the quaternary ammonium group may be any of a wide variety. Typical anions include the halides (chloride, bromide, iodide), nitrate, sulphate, phosphate, acetates, formates, chloroacetates, oxalates and benzoates.

In general, it is preferred to employ sufficient of the monoquaternary ammonium compound and the polyamine to react with all of the salt groups of the bentonite. The best results are obtained when less than one equivalent of the polyamine is used for each ten equivalents of the quaternary ammonium compound containing the two fatty groups. The equivalent weight of the polyamine is the molecular weight of the compound divided by the number of amino groups present therein. It is not possible to specify precisely the amount of polyamine to use, since this depends on the nature of the hydrocarbon to be gelled, the nature of the polyamine and the use to which the grease is to be put. It has been definitely established, however, that some of the polyamine is required in order to obtain the benefits of the present invention, and that one equivalent per ten equivalents of the monoquaternary ammonium compound appears to be near the upper limit. Even minute quantities of the polyamine are beneficial.

In preparing the bentonite complex, the bentonite is dispersed in water in the form of a dilute dispersion, for example, a 1% dispersion. The polyamine is then dissolved in a suitable solvent which in many instances may be water. This solution is then added to the bentonite dispersion. The quaternary ammonium compound is then dissolved in a suitable solvent, and may be added to the dispersion. The reaction is preferably carried out at room temperature and involves the simple admixing of the polyamine and the quaternary ammonium compound with the bentonite dispersion. The reaction proceeds readily and the reaction product appears as a flocculent precipitate which comes down almost immediately upon admixing the reactants. The product can readily be recovered by simple filtration and drying. Instead of adding the polyamine and the quaternary ammonium compound separately, they may be added at the same time.

The complex of bentonite and the polyamine and the quaternary ammonium compound can be used to gel organic materials which are essentially hydrocarbon in character. These include ordinary liquid petroleum hydrocarbons, mineral oils, lubricating oils, aromatic liquid hydrocarbons as well as halogenated hydrocarbons. In preparing these gels, the complex described above is reduced to a finely divided powder and then incorporated into the oil and thoroughly distributed therein. This can be accomplished by means of a colloid mill or a paint mill. The products in general are extremely stiff greases. The comparative stiffness of these greases has been determined by measuring the load in grams necessary to start rotation of a spindle (in the form of a bent, steel rod) attached to a Stormer viscosity machine. The higher the load required to rotate the spindle in the grease, the greater the stiffness. In general, the stiffness of the grease produced from the combination of the polyamine and the quaternary ammonium compound is several times that of comparable greases made with complexes which are presently on the market and which are derived from the quaternary ammonium compound alone. Some of these results will be evident from the examples given hereinafter. Another factor which is important in greases of this type is the ability of the grease to hold the oil and to keep it from separating. The examples will likewise demonstrate a superiority in this respect of the present products over the ordinary bentone greases.

*Example 1*

A solution of 0.05 part of the diacetate of ethylenediamine in water was added to 1000 parts of 1% aqueous bentonite dispersion. A solution of 5.5 parts of dimethyldioctadecylammonium chloride in isopropyl alcohol was then added. The precipitate which formed was filtered off, washed with water and dried. It was milled into heavy mineral oil, giving at 10% solids a grease of stiffness 1050.

A similar grease, prepared without the ethylenediamine diacetate, had stiffness 125.

*Example 2*

A complex was prepared as in Example 1, except that 0.05 part of the diacetate of diethylenetriamine was used in place of ethylene diacetate. A grease (10% solids) prepared from it and mineral oil had stiffness 1150.

*Example 3*

A mixture of 80.3 parts of diethylamine, 74.8 parts of triglycoldichloride, and 160 parts of butyl alcohol was refluxed for 19 hours. The mixture was then filtered and stripped of solvent under reduced pressure. The residue was mixed with benzene, washed with concentrated sodium hydroxide solution in water and then distilled to give, 1,2-bis(2-diethylaminoethoxy)ethane, a colorless liquid boiling at 85–100° C. at 0.05–0.10 mm. of mercury. This diamine was converted to its diacetate by the addition of the calculated amount of acetic acid.

A complex was prepared as in Example 1 using 0.15 part of the above diacetate in place of the ethylenediaminediacetate. When milled into heavy mineral oil at 10% solids it gave a grease of stiffness 550.

*Example 4*

A complex was prepared as described in Example 1, using 0.06 part of benzidine diacetate. When milled into heavy mineral oil, it gave a grease (10% solids) of stiffness 1950.

*Example 5*

1,2-bis(2-dioctadecylaminoethoxy)ethane was prepared by heating dioctadecylamine with triglycol dichloride at 170° C. Its diacetate was prepared by adding the calculated amount of acetic acid.

A complex was prepared as described in Example 1, using 0.23 part of this diacetate. When milled into heavy mineral oil at 10% solids content, it gave a grease with a stiffness greater than 2025. When this grease was diluted to 5% solids by having more mineral oil milled into it, the stiffness value was 450. This 5% grease did not separate oil upon standing.

Another complex, prepared in a similar manner but without the amine diacetate, gave a 10% grease of stiffness 125. When diluted to 5% solids, this grease separated oil.

*Example 6*

1,2-bis(2-octadecylaminoethoxy)ethane was prepared by heating triglycol dichloride with octadecylamine. It was converted to its sulfate by the addition of sulfuric acid.

A complex was prepared as described in Example 1, using 0.15 part of this amine sulfate. When milled into heavy mineral oil at 10% solids, it gave a grease of stiffness 1700.

*Example 7*

A solution of 0.23 part of 1,2-bis-(2-dioctadecylaminoethoxy)ethane in isopropyl alcohol was added to 1000 parts of 1% aqueous bentonite dispersion. A solution of 5.5 parts of dioctadecyldimethylammonium chloride in isopropyl alcohol was then added. The mixture was filtered and the precipitate was dried and crushed. When milled into heavy mineral oil at 10% solids concentration, it gave a grease, stiffness 1650. When this was diluted to 5% solids by milling in added oil, the stiffness was 350. This 5% grease did not separate oil.

*Example 8*

A solution of 0.02 part of diethylenetriamine in water was added to 1000 parts of 1% aqueous bentonite dispersion. A solution of 5.5 parts of dioctadecyldimethylammonium chloride in isopropyl alcohol was then added. The mixture was filtered and the precipitate was dried and crushed. When milled into heavy mineral oil at 10% solids concentration, it gave a thick grease, stiffness 2025.

I claim as my invention:

1. A bentonite complex consisting essentially of the reaction product of bentonite and (a) a polyamine containing at least 2 amino groups which are sufficiently basic to form acetate salts, said polyamine being the reaction product of a compound selected from the group consisting of ammonia and alkyl amines with a dihalide selected from the group consisting of dihalides in which the halogen atoms are separated by an alkylene group containing from 2 to 6 carbon atoms and dihalides in which the halogen atoms are separated by a polyoxyalkylene group containing from 2 to 6 recurring units, each alkylene group containing from 2 to 6 carbon atoms and (b) a quaternary ammonium compound having two alkyl groups attached to the nitrogen atom, each of said alkyl groups containing from 8 to 22 carbon atoms, said nitrogen atom also being substituted with two alkyl groups containing from 1 to 4 carbon atoms, the quantity of (a) being less than one equivalent per 10 equivalents of (b) but sufficient to materially stiffen a grease made from said complex, the total quantity of (a) and (b) being such that essentially all of the exchangeable metal cation in the bentonite is replaced by the cations of (a) and (b).

2. A bentonite complex consisting essentially of the reaction product of bentonite and (a) a polyamine containing at least two amino groups which are sufficiently basic to form acetate salts, said polyamine being the reaction product of an amine containing at least one alkyl group of from 8 to 22 carbon atoms and a dihalide in which the halogen atoms are separated by an alkylene group containing from 2 to 6 carbon atoms, and (b) a quarternary ammonium compound having two alkyl groups attached to the nitrogen atom, each of said alkyl groups containing from 8–22 carbon atoms, the quantity of (a) being less than one equivalent per 10 equivalents of (b) and the total quantity of (a) and (b) being such that essentially all of the exchangeable metal cation in the bentonite is replaced by the cations of (a) and (b).

3. A bentonite complex consisting essentially of the reaction product of bentonite and (a) a polyamine containing at least two amino groups which are sufficiently basic to form acetate salts, said polyamine being the reaction product of an amine containing at least one alkyl group of from 8 to 22 carbon atoms and a dihalide in which the halogen atoms are separated by a polyoxyalkylene group containing from 2 to 6 recurring units, each alkylene group containing from 2 to 6 carbon atoms, and (b) a quarternary ammonium compound having two alkyl groups attached to the nitrogen atom, each of said alkyl groups containing from 8–22 carbon atoms, the quantity of (a) being less than one equivalent per 10 equivalents of (b) and the total quantity of (a) and (b) being such that essentially all of the exchangeable metal cation in the bentonite is replaced by the cations of (a) and (b).

4. A bentonite complex consisting essentially of the reaction product of bentonite and (a) a polyamine containing at least two amino groups which are sufficiently basic to form acetate salts, the polyamine being the reaction product of ethylene dichloride and ammonia, and (b) a quarternary ammonium compound having two alkyl groups attached to the nitrogen atom, each of said alkyl groups containing from 8–22 carbon atoms, the quantity of (a) being less than one equivalent per 10 equivalents of (b) and the total quantity of (a) and (b) being such that essentially all of the exchangeable metal cation in the bentonite is replaced by the cations of (a) and (b).

References Cited in the file of this patent

UNITED STATES PATENTS

| | | |
|---|---|---|
| 2,033,856 | Smith | Mar. 10, 1936 |
| 2,248,636 | Marsden | July 8, 1941 |
| 2,348,639 | O'Brien | May 9, 1944 |
| 2,531,396 | Carter et al. | Nov. 28, 1950 |
| 2,531,427 | Hauser | Nov. 28, 1950 |
| 2,531,440 | Jordan | Nov. 28, 1950 |
| 2,559,398 | Capell | July 3, 1951 |
| 2,626,241 | Sparks et al. | Jan. 20, 1953 |